(No Model.)
L. O. HOWELL, Jr.
IMPLEMENT FOR CLEANING THE BOWLS OF WATER CLOSETS.
No. 265,320. Patented Oct. 3, 1882.
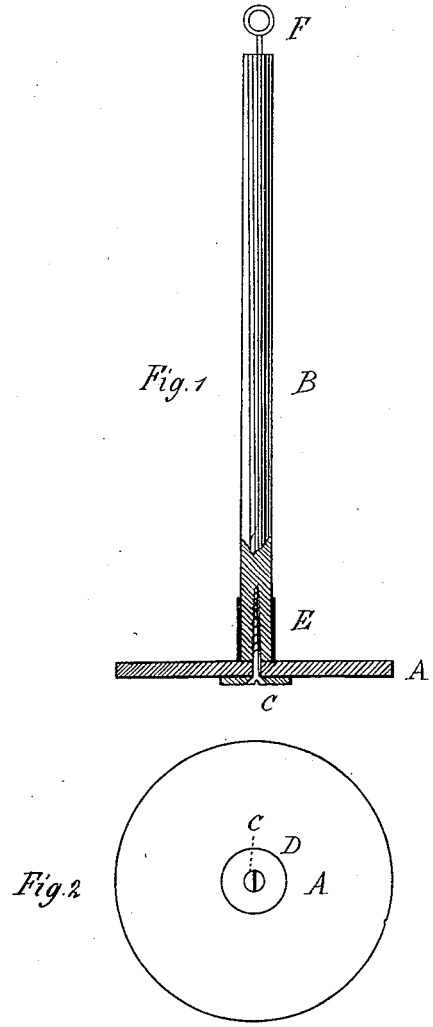
Witnesses —
Wm. A. Lane
John Buckler.
Inventor —
Lewis O. Howell, Jr.
By A. M. Pierce,
Atty.

UNITED STATES PATENT OFFICE.

LEWIS O. HOWELL, JR., OF PHILADELPHIA, PENNSYLVANIA.

IMPLEMENT FOR CLEANING THE BOWLS OF WATER-CLOSETS.

SPECIFICATION forming part of Letters Patent No. 265,320, dated October 3, 1882.

Application filed February 28, 1882. (No model.)

*To all whom it may concern:*

Be it known that I, LEWIS O. HOWELL, Jr., of Philadelphia, county of Philadelphia, and State of Pennsylvania, have invented certain new and useful Improvements in Implements for Cleaning the Bowls of Water-Closets, of which the following is a full, clear, and exact description, reference being had to the accompanying drawings, and to the letters of reference marked thereon.

My invention relates especially to implements for cleaning the bowls of water-closets, sinks, &c., and has for its object the production of a device which is simple and cheap to construct, durable in use, and which effectively accomplishes the objects and purposes for which it is intended.

It consists essentially in a disk or half-disk constructed of suitable flexible material, to the center of which is attached, by means of a screw or other device, a handle for operating the instrument; and my invention involves certain novel and useful combinations or arrangements of parts and peculiarities of construction, all of which will be hereinafter first fully described, and then pointed out in the claim.

In the drawings, Figure 1 is an elevation and partial section of my improved device, and Fig. 2 is a plan view of the disk.

Like letters of reference, wherever they occur, indicate corresponding parts in both the figures.

A is a disk or plate, cast of rubber or cut out of rubber cloth of suitable thickness. If desired, thin rubber cloth may be used, and two or more disks be employed; but in practice one disk of sufficient thickness to give the requisite stiffness will be found ample. The disk A might be composed of any other flexible material not readily acted upon by water, and which would not absorb the odor of the closet.

B is a handle or shaft, constructed of wood or any other preferred material, said handle being attached to the center of disk A by means of a screw, C, passing through a washer, D, as shown.

E is a ferrule located at the lower extremity of handle B, and F is a screw-eye or ring for hanging the device up when not in use.

Instead of using a whole disk, as shown, a half-disk might be constructed upon the same principle, and would be found very effective; or the disk and handle might be formed entirely of rubber, in one piece.

When constructed as above described my device will be found to be admirably adapted for cleaning the sides of the bowls of water-closets of adhering paper, &c., the flexible edges of the disk permitting a thorough passage over all parts of the bowl, and by dropping the pan all the matter collected thereabove may be easily pushed into the soil-pipe.

I am aware that a rubber cup inverted and attached to a handle having a wide solid flange at the base thereof has been employed for cleaning wash-bowls, &c., and to such a construction I make no claim.

Having now fully described my invention, what I claim as new therein, and desire to secure by Letters Patent, is—

An implement for cleaning the bowls of water-closets, consisting of a flat flexible disk to the center of which is attached a handle or shaft, substantially as shown and described.

In testimony that I claim the foregoing I have hereunto set my hand in the presence of two witnesses.

LEWIS O. HOWELL, JR.

Witnesses:
 FRANK CRAVEN,
 CHARLES A. SCHMIDT.